(12) United States Patent
Nikolov et al.

(10) Patent No.: US 7,917,656 B2
(45) Date of Patent: *Mar. 29, 2011

(54) STATISTICS MONITORING FOR MESSAGING SERVICE

(75) Inventors: Radoslav I. Nikolov, Vidin (BG); Desislav V. Bantchovski, Sofia (BG); Stoyan M. Vellev, Sofia (BG)

(73) Assignee: SAP AG, Walldorf (DE)

( * ) Notice: Subject to any disclaimer, the term of this patent is extended or adjusted under 35 U.S.C. 154(b) by 1279 days.

This patent is subject to a terminal disclaimer.

(21) Appl. No.: 11/322,441

(22) Filed: Dec. 29, 2005

(65) Prior Publication Data

US 2007/0153767 A1   Jul. 5, 2007

(51) Int. Cl.
*G06F 15/16* (2006.01)
*H04L 12/28* (2006.01)
*H04L 12/56* (2006.01)

(52) U.S. Cl. ........ 709/250; 709/207; 370/412; 370/413; 370/414; 370/415; 370/416

(58) Field of Classification Search ................... 709/207, 709/236, 250; 370/392, 352, 412, 413, 414, 370/415, 416
See application file for complete search history.

(56) References Cited

U.S. PATENT DOCUMENTS

| | | | |
|---|---|---|---|
| 6,877,163 B1 | 4/2005 | Jones et al. | |
| 7,003,556 B2 * | 2/2006 | Ooe et al. | 709/219 |
| 7,356,562 B2 | 4/2008 | Yoon | |
| 7,460,874 B1 | 12/2008 | Hou et al. | |
| 2003/0037069 A1 * | 2/2003 | Davison | 707/200 |
| 2003/0056073 A1 * | 3/2003 | Zeiger | 711/170 |
| 2003/0105800 A1 | 6/2003 | Cullen | |
| 2004/0117794 A1 * | 6/2004 | Kundu | 718/102 |
| 2004/0202165 A1 * | 10/2004 | Aoki et al. | 370/392 |
| 2005/0240667 A1 | 10/2005 | Koegel | |
| 2005/0246186 A1 | 11/2005 | Nikolov | |
| 2005/0256931 A1 | 11/2005 | Follmeg et al. | |
| 2005/0262205 A1 | 11/2005 | Nikolov et al. | |
| 2005/0262215 A1 | 11/2005 | Kirov et al. | |
| 2005/0283517 A1 | 12/2005 | Meduri et al. | |
| 2006/0010125 A1 * | 1/2006 | Beartusk et al. | 707/4 |
| 2006/0206905 A1 | 9/2006 | Werner | |
| 2007/0153767 A1 * | 7/2007 | Nikolov et al. | 370/352 |
| 2007/0156823 A1 | 7/2007 | Andreeva et al. | |
| 2007/0156833 A1 | 7/2007 | Nikolov | |

OTHER PUBLICATIONS

Non-Final Office Action for U.S. Appl. No. 11/322,434 Mailed Dec. 8, 2008, 18 pages.
"U.S. Appl. No. 11/322,434, Response filed Jul. 13, 2010 to Non Final Office Action mailed Mar. 23, 2010", 10 pgs.

* cited by examiner

*Primary Examiner* — Nathan Flynn
*Assistant Examiner* — Stephanie Chang
(74) *Attorney, Agent, or Firm* — Schwegman, Lundberg & Woessner, P.A.

(57) ABSTRACT

A messaging service is described that incorporates messages into cached link lists. The messages are not yet acknowledged as having been received by one or more consumers to whom the messages were sent. A separate link list exists for each of a plurality of different message priority levels. Messages within a same link list are ordered in their link list in the same order in which they where received by the messaging service. At least one of the link lists contains an element that represents one or more messages that are persisted but are not cached in any of the cached link lists.

21 Claims, 15 Drawing Sheets

STATISTICS MONITORING FOR MESSAGING SERVICE

FIELD OF INVENTION

The field of invention relates generally to the software arts, and, more specifically, to statistics monitoring for a messaging service.

BACKGROUND

Component based software environments use granules of software (referred to as "components" or "component instances") to perform basic functions. In object oriented architectures, a component instance may be constructed from one or more object instances. The functional granularity offered by a plurality of different components provides a platform for developing a multitude of more comprehensive tasks. Some examples of component based architectures include Java 2 Enterprise Edition (J2EE), Common Object Request Broker Architecture (CORBA), Component Object Model (COM) and Distributed Component Object Model (DCOM) among others.

A container is a type of software platform that largely defines the operating environment of the software components that it "contains". The platform or operating environment defined by a container is usually at least partially defined by a set of "services". For example, in the case of a J2EE container, the layer of services offered by the J2EE container include a Java Naming and Directory Interface (JNDI) service, Java Database Connectivity (JDBC) service and a Java Messaging Service (JMS) among others.

FIG. 1 shows an exemplary implementation of a physical machine 101 (e.g., a computer) having a plurality of containers 103_1 through 103_Z. Each container 103_1 through 103_Z is depicted as containing its own respective application software programs 106_1 through 106_J and 107_1 through 107_K that, in the case of a component based environment are each constructed from their own respective component instance(s).

For example, in the case of J2EE EJB containers, application programs are made of one or more Enterprise Java Bean (EJB) component instances, or, in the case of J2EE web containers, application programs are made of one or more Java servlet component instances and/or Java Server Pages (JSPs) (for Web containers). A Java servlet is used to support the invocation of functional task(s) called from a web page (such as a JSP) that has been downloaded to a client computer. A web page is a text document typically written in a markup language (such as HTML or XML).

Each container 103_1 through 103_Z is depicted as having its own associated layer of services 104_1 through 104_Z. A messaging service 105_1 through 105_Z is depicted as being associated with each container's respective layer of services 104_1 through 104_Z. In component based architectures, a messaging service is a body of software ("program code") that is responsible for the delivery of a message to the component to which the message has been sent. As such, messaging service 105_1 is responsible for the delivery of messages to applications 106_1 through 106_J, and, messaging service 105_Z is responsible for the delivery of messages to applications 107_1 through 107_K.

The applications observed in FIG. 1 may receive messages, for instance, as a consequence of component-to-component messaging (e.g., a first component invokes a method performed by a second component), or, web page to component messaging. In the case of J2EE, the messaging services 104_1 through 104_Z correspond to instances of the Java Messaging Service (JMS). Note that each messaging service 105_1 through 105_Z may be different instances of the same program code. Each messaging service instance may also support the sending of messages from the applications of its respective container to destinations residing outside its respective container.

A pertinent feature of an operational messaging service is its performance (e.g., how quickly it can deliver messages to the proper recipients) as measured against the resources its consumes. In the case of messaging services 105_1 through 105_Z, their ability to quickly deliver messages to their respective recipient applications ("consumers") depends on where the messages are located at the time the messages are to be forwarded from the service to the application. Specifically, message delivery will be much faster if the message is "cached" within the physical machine's memory 102 rather than being persisted in a persistence layer. The persistence layer may, for instance, include one or more remote databases 109 (or simply remote database 109) that stores persisted versions of received messages. Remote database 109 is assumed to be communicatively coupled to physical machine 109 either directly or through a network.

Because the physical memory 102 of the machine is limited, and because other more important (or equally important) software functions consume the physical memory's resources, the amount 108 of physical memory that is made available for the message service instances 105_1 through 105_Z is limited to some percentage of the computing system's overall amount of memory. Thus, there exists the challenge of trying to ensure that messages are cached rather than persisted when needed for delivery to a consumer in cases where the amount of memory allocated to the message service for caching is insufficient to store all messages waiting to be delivered to their respective consumer.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Messaging Service Architecture

Figure 2:
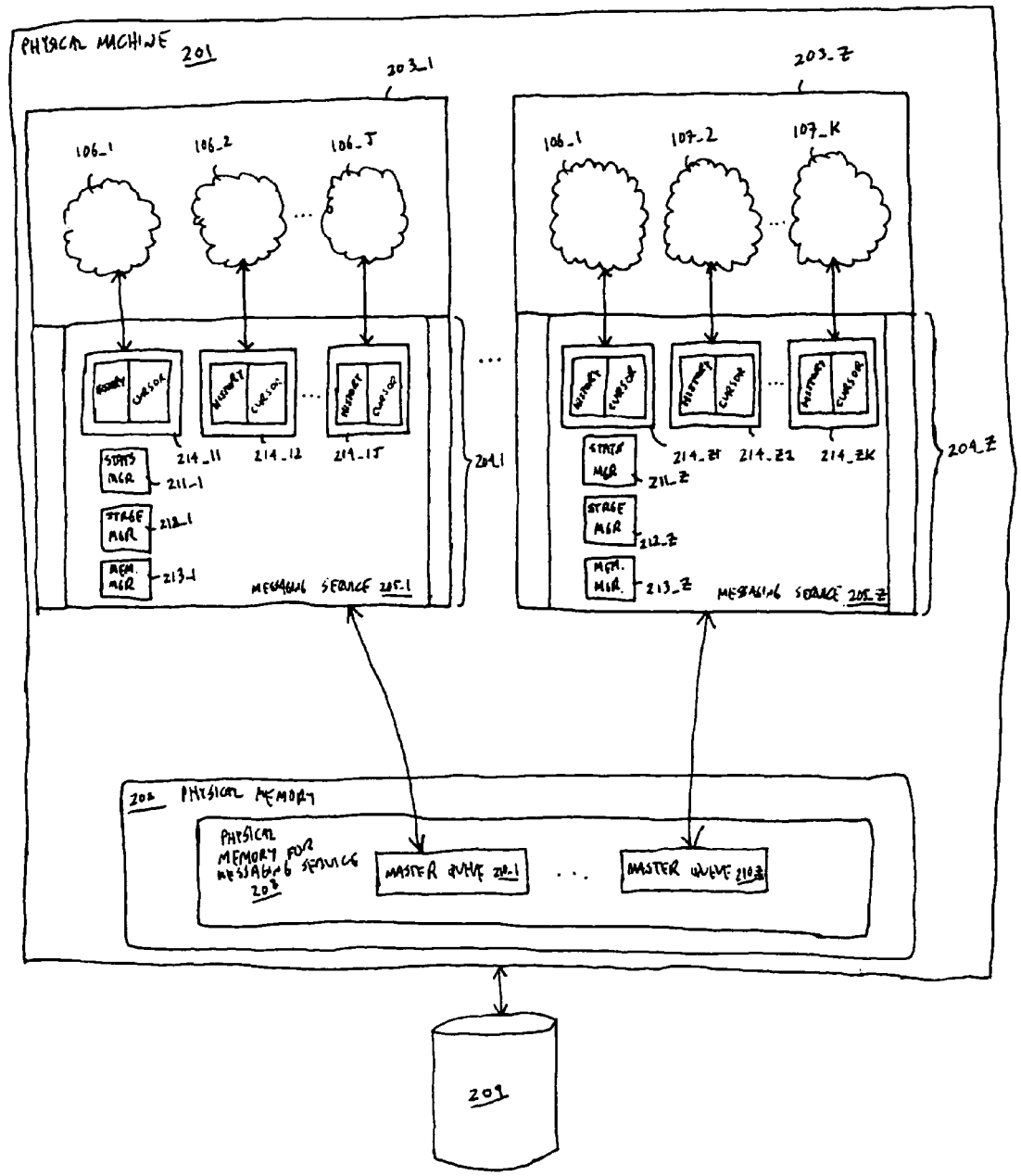
FIG. 2 shows a messaging service architecture.

FIG. 2 shows a messaging service architecture that attempts to deliver cached messages from memory to a consumer (rather than, for instance, from a database or hard disk file), while, at the same time, conserving the use of memory resources. For simplicity, the term consumer shall mean an application consisting of more than one software component, or, a singular software component (e.g., a single EJB).

Figure 1:
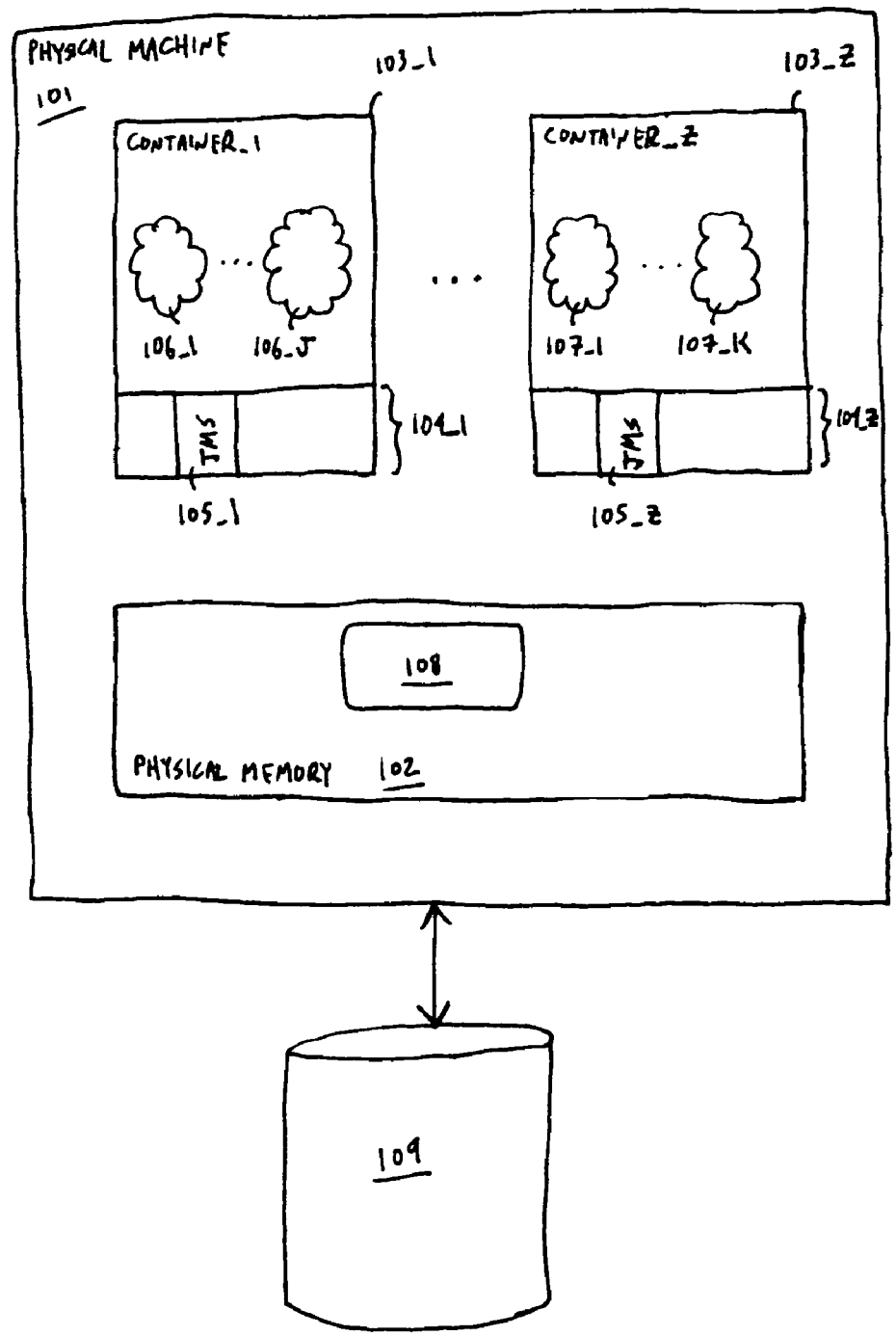
FIG. 1 (prior art) shows a physical machine having container instances that each provide a messaging service.

Like FIG. 1, FIG. 2 shows a plurality of containers 203_1 through 203_Z implemented by a physical machine 201, and, messaging service instances 205_1 through 205_Z associated with layers of services 204_1 through 204_Z offered by respective containers 203_1 through 203_Z. Each messaging service instance delivers messages to its respective applications which are contained by its respective container. For instance, messaging service instance 205_1 delivers messages to applications 106_1 through 106_J which are contained by container 203_1 (likewise, messaging service instance 205_Z delivers messages to applications 107_1 through 107_K which are contained by container 203_Z).

The portion of the physical machine's memory 202 that is allocated for the caching of messages waiting to be delivered to their respective consumer(s) is shown as memory portion 208. An external database 209 is also shown. Importantly, each messaging service instance 205_1 through 205_Z attempts to ensure that messages delivered to their respective consumers are delivered from memory 208 rather than database 209.

As depicted, each messaging service instance 205_1 through 205_Z has its own respective master queue 210_1 through 210_Z located in memory portion 208. Each messaging service instance 205_1-205_Z also has its own respective statistics manager 211_1-211_Z, storage manager 212_1-212_Z and memory manager 213_1-213_Z. Each messaging service instance also maintains a history and cursor component pair for each application within its respective container (i.e., messaging service instance 205_1 maintains history and cursor component pairs 214_11-214_1J for applications 106_1 through 106_J, respectively . . . messaging service instance 205_Z maintains history and cursor component pairs 214_Z1 through 214_ZK for applications 107_1 through 107_K, respectively).

The master queues 210_1 through 210_Z contain cached messages destined for applications within their respective containers 203_1 through 203_Z. As will be explained in more detail with respect to FIG. 3, the messages within each master queue 210_1 through 210_Z are organized according to the manner in which the database 209 has been organized to store persisted versions of the messages that are kept in the master queues. For the sake of example, as a simple implementation, it may be assumed that each message that is cached in a master queue also has a corresponding persisted copy within database 209.

The statistics manager of a messaging service instance (e.g., statistics manager 211_1 of messaging service instance 205_1) is responsible for monitoring various operational parameters associated with its respective messaging service instances. For example, according to one implementation, the statistics manager measures: (i) the rate at which each one of its respective consumers is asking for new messages; (ii) the time that is expected to elapse (or alternatively, the number of cached messages that can be delivered before a non cached message is reached), for each one of its respective consumers, before messages that are not currently cached will need to be delivered, and, (iii) the sizes of the master queues being utilized by other messaging service instances.

The storage manager of a messaging service instance (e.g., storage manager 212_1 of messaging service instance 205_1) is responsible for basic operational tasks that pertain to its corresponding master queue or to the database 209. Such tasks may include: (i) persisting newly arriving messages in the database 209; and, (ii) adding newly arriving messages to the messaging service's master queue if sufficient memory space exists. According to a further implementation, the storage manager of a messaging service instance is also responsible for taking certain actions with respect to its corresponding master queue 210 in light of the parameters being measured by its corresponding statistics manager. Examples include evicting certain messages from the master queue to database 209 and/or calling up certain messages from database 209 into a master queue.

The memory manager of a messaging service instance (e.g., memory manager 213_1 of messaging service instance 205_1) is responsible for requesting additional memory resources to be allocated to its respective messaging service instance's master queue. As elaborated on in more detail below with respect to FIGS. 13 through 15, the memory managers of the various messaging service instances are organized in a collective hierarchy so that memory allocation devoted to messaging services can be readily determined across a wide range of possible perspectives (e.g., per messaging service instance, per container instance, for the physical machine as a whole, etc.).

Figure 3:
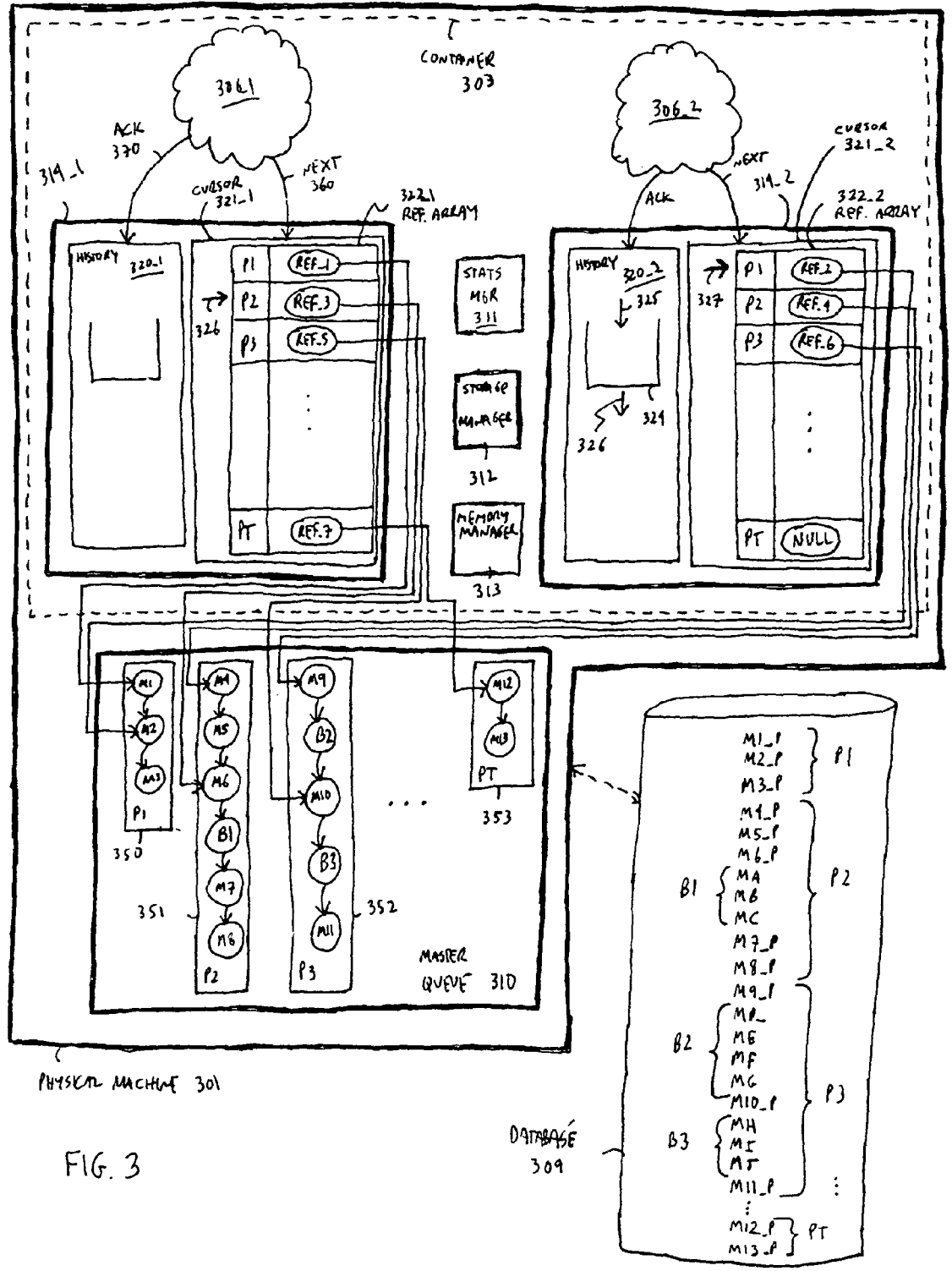
FIG. 3 shows a detailed perspective of a messaging service instance.

FIG. 3 shows a more detailed depiction of the master queue structure 310 for a single messaging service instance. Specifically, master queue 310 is part of a messaging service instance that includes history and cursor component pairs 314_1, 314_2. For ease of drawing, the messaging service instance is depicted as presently servicing only two consumers 306_1 and 206_2. In practical implementation it is expected that many more consumers could be serviced by a single messaging service instance, hence, it is expected that a single messaging service instance would have many more history and cursor component pairs than the just the pair 314_1, 314_2 depicted in FIG. 3.

As discussed above, the master queue 310 corresponds to the message service instance's cache and is depicted as containing thirteen cached messages M1 through M13. Each of these messages have yet to be successfully delivered to their respective consumers (which may be one or both of applications 306_1 and 306_2). Recall that, according to a simplistic perspective, cached messages are also persisted in database 309. As such, FIG. 3 also shows the database 309 as containing respective persisted versions M1_P through M13_P of messages M1 through M13. As will be elaborated on in more detail below, note also that the database contains "non-cached" messages MA through MJ which are also destined for delivery to either or both of consumers 306_1 and 306_2.

According to the exemplary depiction of FIG. 3, the database 309 can be viewed as being sub-divided into logical regions, where, each region contains messages of a specific priority. Specifically, messages M1_P through M3_P are associated with a first priority level P1; messages M4_P through M6_P, MA through MC, and M7_P, M8_P are associated with a second priority level P2; messages M9_P, MD through MG, M10_P, MH through MJ, and M11_P are associated with priority level P3; and, messages M12_P and M13_P are associated with priority level PT. According to one view priority level P1 is higher than priority level P2, priority level P2 is higher than priority level P3, etc., and priority level PT is the lowest priority level. Here, higher priority messages are supposed to exhibit lower transportation latency processing by the message delivery system than lower priority messages. Thus, if multiple messages across different priority levels are waiting to be delivered, the messaging service instance is geared to deliver the higher priority messages before the lower priority messages.

The master queue 310 is designed to reflect the priority-level organization of the database 309. According to one implementation, cached messages from a same priority level are referenced through a (double-) link list that is created for that priority level. Thus, as seen in FIG. 3, a first link list 350 for priority level P1 is used to cache messages M1 through M3, a second link list 351 for priority level P2 is used to cache messages M4 through M8, a third link list 352 for priority level P3 is used to cache messages M9 through M11, etc., and a Tth link list 353 for priority level PT is used to cache messages M12 and M13. As is known in the art, a double-link list is a chain of elements stored in memory where an element in the chain contains information that helps identify where the next element and the previous element in the chain can be found in memory.

With respect to the link list observed within the master queue 310, each chain element corresponds to either a message or a "blank". A blank element is a link list element used to represent persisted but non cached messages (i.e., messages that are kept in database 309 but have no corresponding copy in master queue 310), where, the priority level of these messages are the same as that of the link list. For instance, comparing both the database 309 and the master queue 310, note that: 1) blank element B1 in P2 link list 351 is used to represent messages MA through MC; 2) blank element B2 in P3 link list 352 is used to represent messages MD through MG; and, 3) blank element B3 in P3 link list 352 is used to represent messages MH through MJ.

Here, not only is the database 309 assumed to be divided into logical regions based on priority level, but also, the persisted messages within a database priority level are also assumed to be ordered according to some algorithm or scheme. For instance, each database priority level is viewed as a FIFO "stack" where later arriving messages are located beneath earlier arriving messages (e.g., referring to priority level P1, message M1 arrived before message M2, which arrived before message M3).

Viewing the database 309 of FIG. 3 according to this perspective, the messages are ordered in the database 309 according to the manner in which they should be delivered to their corresponding consumers. Specifically, higher messages in the list of messages observed in the database 309 should be delivered before lower messages in the list (because higher priority messages are listed above lower priority messages, and, within a priority level, later arriving messages are listed below earlier arriving messages).

The location of the one or more blanks within a link list respects the ordering within the database. For instance, blank B1 of P2 link list 350, which represents messages MA through MC, is inserted between message element M6 and message element M7, which, corresponds to the ordering observed in database 309. The contents of the master queue 310 can therefore be viewed as a "snapshot" of the contents of the database 309.

According to one approach, the memory address values where the individual cached messages M1 through M13 are actually stored in memory are determined by hashing a PCounter value. A PCounter (which stands for Priority Counter) value is essentially a unique numeric identifier for a message, formed by the concatenation of a one-digit priority number and a sequential number (i.e. a counter incremented by one for every next message). According to a further approach, each cached message may be divided into a header part and a message body part, each separately accessible—the headers through a double-link list and the bodies through a hash table with PCounter as the key. Here, the messaging service (and/or other services and/or applications) may desire to perform operations with the message headers only. Because message headers typically consume much less memory space than message bodies, these operations can be performed with cached header information even if there was not enough room to cache the message bodies themselves. For purposes of this application, the term "message" means at least a message body.

Each cursor component 321_1, 321_2 contains a respective table of references (reference arrays 322_1, 322_2) that each contain a collection of references to messages within the master queue 310 and is organized by message priority (like the master queue 310 and database 309). According to one implementation, there exists only one reference into the master queue 310 per reference array priority level, where, each such reference points to the first message in the master queue's corresponding link list (at the same priority level) that is directed to the reference array's corresponding consumer. An example is observed in FIG. 3 where the P1 priority level for the reference array 322_1 for consumer 306_1 contains a reference REF_1 to message M1 in the P1 link list 350 of the master queue 310, while, the P1 priority level for the reference array 322_2 for consumer 306_2 contains a reference REF_2 to message M2 in the same P1 link list 350. Here, message M1 is intended for consumer 306_1 while message M2 is intended for consumer 306_2. Configuring references in this manner permits a faster jump to the correct memory location for a particular message as described below with respect to FIG. 4.

Figure 4:
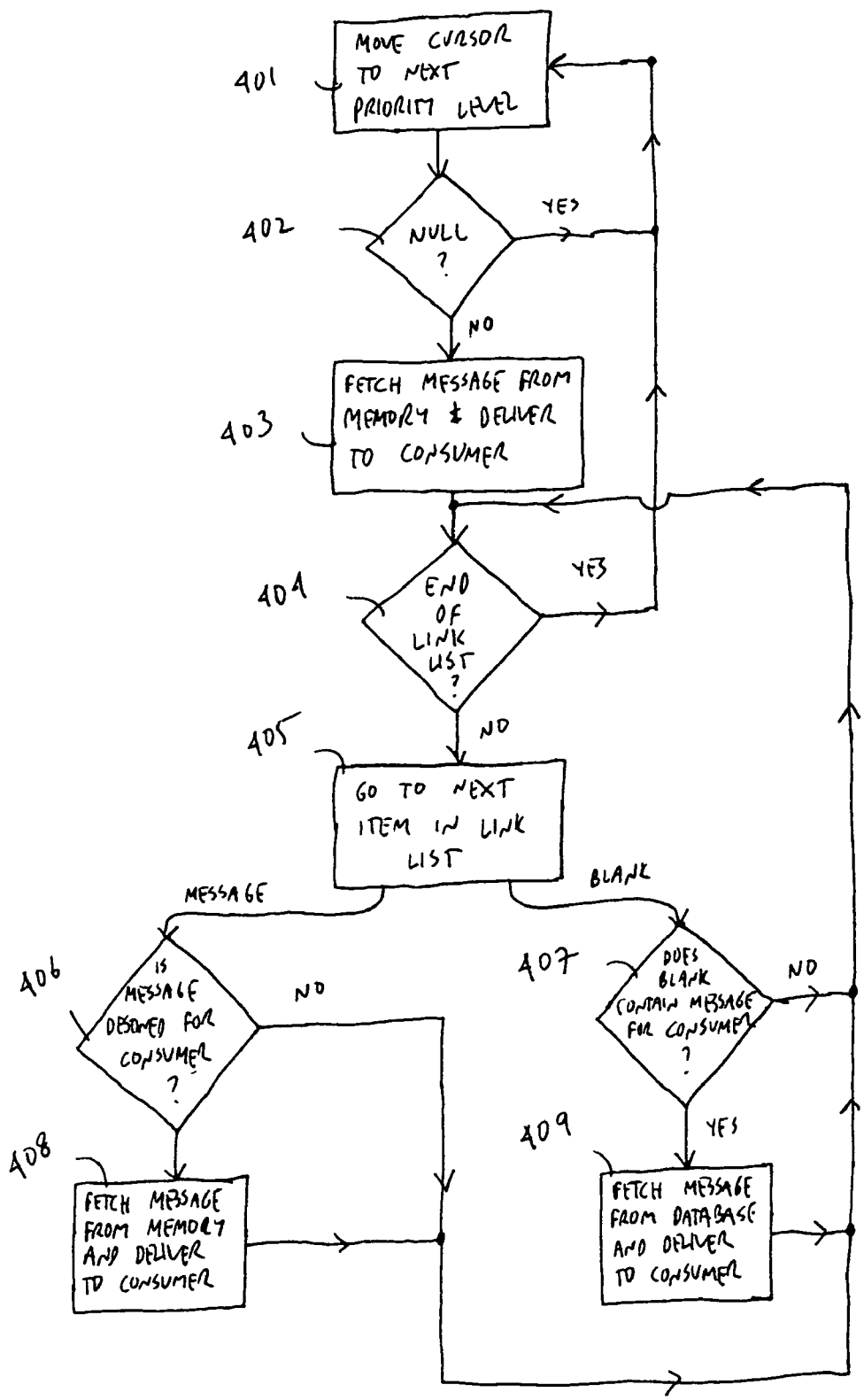
FIG. 4 shows a method for delivering messages to a consumer.

FIG. 4 shows a method for delivering messages to a consumer. According to the methodology of FIG. 4, the consumer component for a particular consumer (e.g., consumer component 321_1 for consumer 306_1 or consumer component 321_2 for consumer 306_2) walks through the master queue 310 on behalf of its consumer (by advancing a pointer or "cursor" 326, 327 against its corresponding reference array 322_1, 322_2), link list element by link list element 405, 406, 407, until a link list element is reached 408, 409 that corresponds to a message that is to be delivered to the consumer for whom the storage component manager is acting (here, because a single master queue may service multiple consumers, a single link list may contain the messages for a number of different consumers). If no link list element is found for the consumer when the end of the link list is reached 404, the cursor is dropped to the next lowest priority level 401 that does not contain a NULL value 402 and fetches the message 403 that is referenced by the entry found in the reference array at the next lowest priority level that does not contain a NULL value.

While processing a particular link list, if the next link list element that corresponds to a message for a particular consumer is five elements down the link list chain from the element where the cursor is presently pointed, the cursor component will have to walk through five link list elements before it can gain access to and deliver this message to the consumer. While the elements within a link list are being analyzed by a consumer component, the information within a link list element points to the next element in the link list. Therefore, the consumer component can determine which element is the "next" element in the link list by referencing the information kept at the element in the link list to which the cursor is currently pointed.

As observed in FIG. 4, if the next link list element that corresponds to a message destined for the consumer is a blank 407, the cursor component causes the message to be retrieved 409 from the database 309 (i.e., a cache miss has occurred). By contrast, if the next link list element that corresponds to a message destined for the consumer is an actual message 405, 407, the cursor component causes the message to be retrieved 409 from memory 308 and delivered to the consumer (i.e., a cache hit has occurred). As discussed at length above, the messaging service is designed to prevent retrieval 409 from the database 309 and promote retrieval 408 from memory 308.

As alluded to above, having a reference array priority level reference the first message in the link list that is destined for the reference array's corresponding consumer (i.e., the answer to inquiry 402 is "no") permits the cursor component to avoid wasteful steps through the link list and immediately retrieve a message 403 from memory 308. For example, as observed in FIG. 3, the presence of REF_3 causes cursor component 321_1 to avoid having to consider messages M4 and M5 (which are destined for consumer 306_2) before delivering message M6 (which is the first message at priority level P2 destined for consumer 306_1) to consumer 306_1.

If no messages are to be delivered to a reference array's consumer at a specific priority level, a NULL value is entered in the reference array at that priority level. An example is observed in reference array 322_2 at the Tth priority level PT. Here, neither of messages M12 or M13 are destined for consumer 306_2, therefore, no reference should be made into link list 353 from reference array 322_2. As observed in FIG. 4, reference array priority levels having a NULL value are essentially "skipped over" 402 by the cursor until a priority level is reached having a reference into the master queue 310.

According to one design approach, a reference array entry cannot reference a blank element in a link list (i.e., either a message is referenced or there are no messages waiting for delivery at the priority level). This means a newly arriving message that represents the only message at its priority level desiring deliver to a consumer must be either be entered into the master queue or dropped (i.e., a blank cannot be created for the only message for a particular consumer at a specific priority level). According to an extension of this design philosophy, the arrival of a new message at a specific priority level that corresponds to the only message for the consumer at that priority level causes the eviction of another message from the master queue (preferably at a lower priority, or, at a lower priority level or else the newly arriving message is dropped). An alternative design approach simply permits a reference array entry to reference a blank element.

Note that in still further implementations, each cursor component may be designed to "jump" the cursor to the priority level of a newly arrived message having a higher priority level than the current cursor position. For instance, if the cursor component is presently processing the P3 link list (because the cursor is pointing at priority P3), and, a new message arrives at priority level P2 or P1, the cursor jumps to the higher priority level and the reference array references and fetches the newly arrived message.

Note also that each cursor component maintains its own cursor. That is, as seen in FIG. 3, cursor component 321_1 maintains cursor 326 and cursor component 321_2 maintains cursor 327. Therefore, multiple cursor components 321_1, 321_2 run through their execution of the methodology of FIG. 4 so as to access the master queue independently of each other which may (and in fact often does) result in the cursors of various reference arrays pointing to different priority levels and therefore different sections of the master queue (i.e., different link lists).

In this case, essentially parallel access to the master queue by different cursor components is possible (i.e., different cursor components are processing different link lists over the same time frame) An even finer degree of granularity permits two or more different cursor components to access the same link list (i.e., when their respective cursors are at the same priority level). According to one approach, when blanks are created in a link list by the storage manager 312 (e.g., by evicting messages from cache) or when a blank is replaced in a link list with its corresponding messages by the storage manager (e.g., messages are copied into the master queue from the database), the storage manager must first lock the neighboring link list elements that reside on either side of the link list element being affected. More details in this regard are provided further below in the next sub-section.

According to one approach, a message in the link list is delivered to a consumer by a cursor component as a response to the consumer having asked its cursor component for a "next" message beforehand (e.g., next message 360 of FIG. 3 from consumer 306_1 to consumer component 321_1). In response to the "next" message the cursor component progresses through the master queue 310 in sequence as discussed above with respect to FIG. 4 until the next message for the consumer is reached. The cursor component then delivers the message to the consumer.

Figure 5:
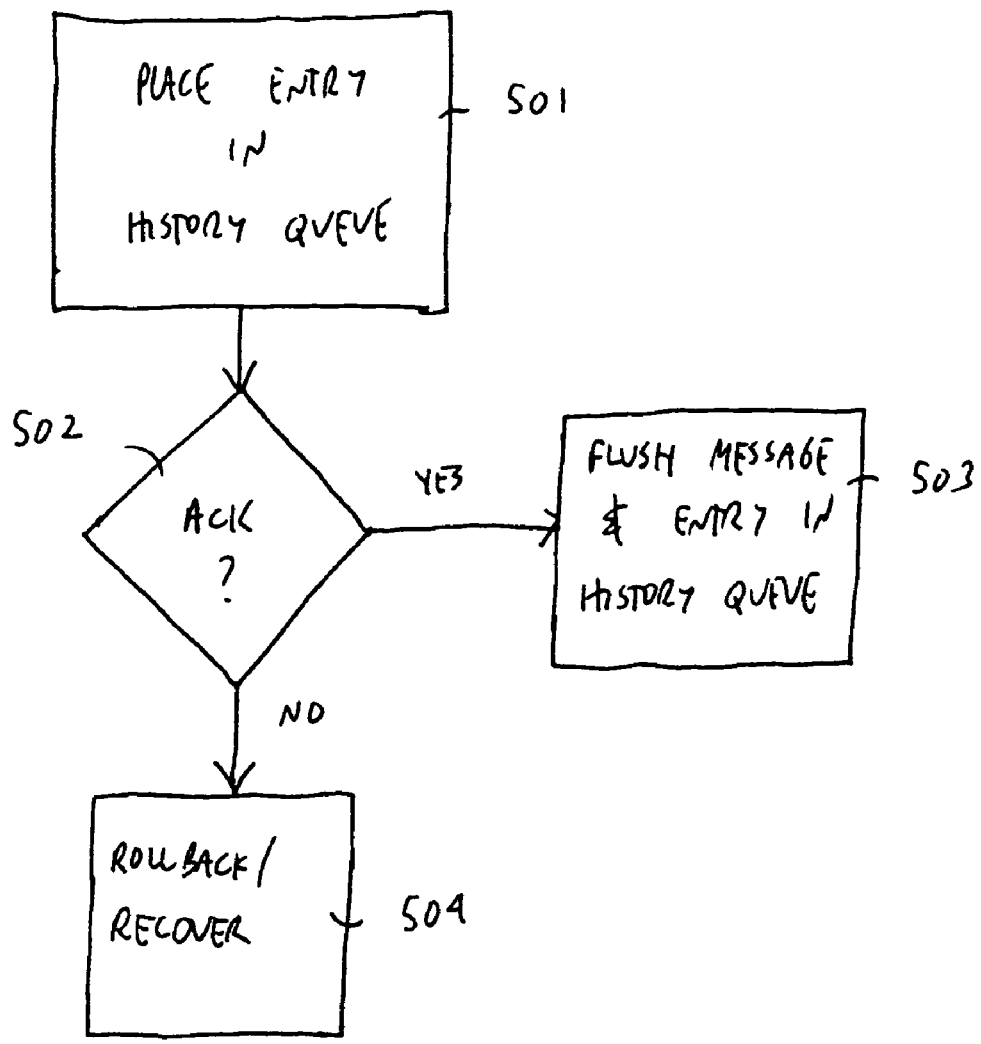
FIG. 5 shows a method for confirming successful or unsuccessful delivery of a message.

FIG. 5 shows a process by which a history component operates once a message has been delivered to its corresponding consumer (e.g., consumer 306_1 for history component 320_1 or consumer 306_2 for history component 320_2) but not yet acknowledged. Here, the successful delivery of a message to a consumer is not confirmed until the consumer acknowledges its successful receipt to its history component with an "ack" message (e.g., ack message 370). As such, the possibility exists that a message may be delivered to a consumer, yet, the consumer fails to acknowledge it.

The history components 320_1, 320_2 of a message service instance record the identity of those messages that have been delivered to their respective consumers 306_1, 306_2 but have not yet been acknowledged by the respective consumers 306_1, 306_2. Using consumer 306_1 and corresponding history component 320_1 as an example, an identifier of a message 325 is entered 501 into a queue 324 maintained by the history component 320_1 upon delivery of a message to the consumer 306_1.

If the consumer 306_1 acknowledges 370 its receipt of the message 502, the history component removes the identifier 326 for the message from the queue 324 and flushes the message from the master queue and database 503. If a single message has multiple consumer destinations serviced by the messaging service instance, the message is not flushed until all appropriate consumers have received the message. Depending on implementation, either the storage manager and/or the history component may be configured to confirm that a message being flushed has been delivered to all of the consumers serviced by the messaging service instance and to whom the message is supposed to be delivered to.

If the consumer fails 306_2 to acknowledge its receipt of the message 502, either a recovery phase or rollback phase 504 is initiated by the history component 320_1 depending on what is specified for the message (e.g., as found with the message's header or information concerning a transaction to which the message belongs). In the case of a rollback, the message is flushed from the master queue and database. In the case of a recovery, the message is re-sent to the consumer in an attempt to have the consumer acknowledge it.

Figure 6:
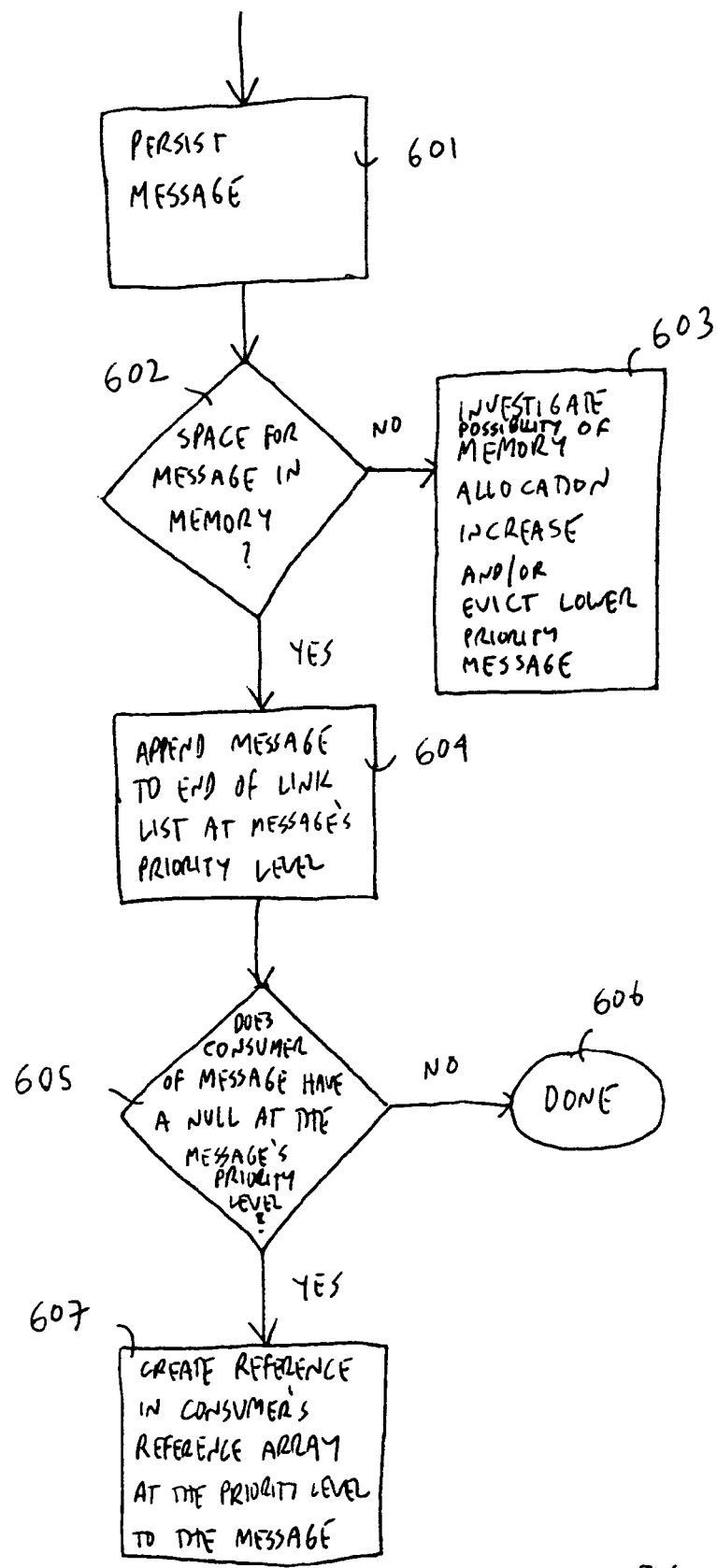
FIG. 6 shows a method for handling the arrival of a new message for delivery to a consumer.

FIG. 6 shows a process executed by the storage manager 312 for handling the arrival of new messages. According to the methodology of FIG. 6, the arrival of a new message triggers its persistence into the database 309. According to a further implementation, the storage manager 312 determines first whether or not a newly arriving message is to be persisted or not (e.g., be examining the message's header or some other information concerning the proper policy for the message). If the message is to be persisted, the storage manager persists the message 601 into the database 309 as described just above. If the message is not to be persisted, the message is only entered in the master queue (i.e., operation 601 is not performed).

If there is not enough memory in the master queue to store a newly arriving message 602, the storage manager may force the eviction of a lower priority message from the master queue into the database (so as to create a blank in the link list at the evicted message's priority level) and/or the memory manager 313 may research into whether or not more memory can be allocated to the master queue 310. If no memory space can be made available for the message (e.g., eviction was not possible or more memory space could not be allocated to the master queue), the message is simply not stored in the master queue. If the message is persisted (e.g., because its policy treatment permits its persistence), a blank is inserted at the end of the link list for the message's priority level (if one does not exist already). According to one embodiment, a blank element is configured to identify how many messages and/or messages falling into what PCounter interval it covers the database range of.

Once it is known that there exists enough memory to cache a message in the master queue, the message is entered at the tail end of the link list maintained for the message's priority level 604. Note that this preserves FIFO delivery of messages at the message's priority level. If any of the consumers to whom the message is to be delivered have a NULL value in their reference array at the message's priority level 605 (which means the newly arriving message corresponds to the first message for the consumer at the priority level's link list), the NULL element is replaced 607 with a reference to the newly arriving message in the master queue 310. Otherwise the process is complete 606.

Avoidance of Cache Misses

As alluded to above, the messaging service instance is configured to avoid the occurrence of a cache miss. A cache miss occurs, as discussed above with respect to FIG. 4, when a message has to be fetched from the database 409 because it was not located in the master queue at the time delivery of the message to the consumer is desired (i.e., when the cursor component advanced its cursor to the message's priority level and advanced through the corresponding link list until the message's associated blank was reached). Moreover, the messaging service instance also strives to make efficient use of the memory resources that has been allocated to it master queue. In this regard, the master queue may be too small in size to cache many or even most of the messages waiting delivery to their respective consumers.

As such, in order to promote the occurrences of cache hits while diminishing the occurrences of cache misses, the messaging service instance has to identify, for each consumer it services, one or more messages that are "about to be" needed for delivery. If a message that is about to be needed for delivery is not presently cached, the messaging service instance (specifically, in one implementation, the storage manager 312) triggers a copy of the message to be read from the database 309 and stored in the master queue (in the link list for the message's priority level). If the master queue is already full of messages at the time a decision is made to bring a copy of the message into the database, the entry of the message into the master will cause the eviction of another message from the master queue (e.g., so that only a persisted version of it remains). Preferably, the evicted message is not about to be needed for delivery either, but rather, is a message that won't be needed for delivery for an extended period of time.

Blanks are important features in implementing the strategy discussed just above. For instance, a blank may represent an evicted message in the link list after its eviction and while the only version of it resides in the database. When the evicted message is called back into the master queue from the database (as a consequence of a decision being made that the evicted message is about to be needed for delivery), the blank is replaced with the message in its original location in the link list. In this manner, because of the use of blanks as discussed herein, a message can be cached, evicted and cached again (perhaps multiple times under certain trafficking conditions) without losing its position in its respective link list. As such, messages can be cached, evicted and cached again without offending the priority and FIFO delivery objectives of the messaging service.

Figure 7:
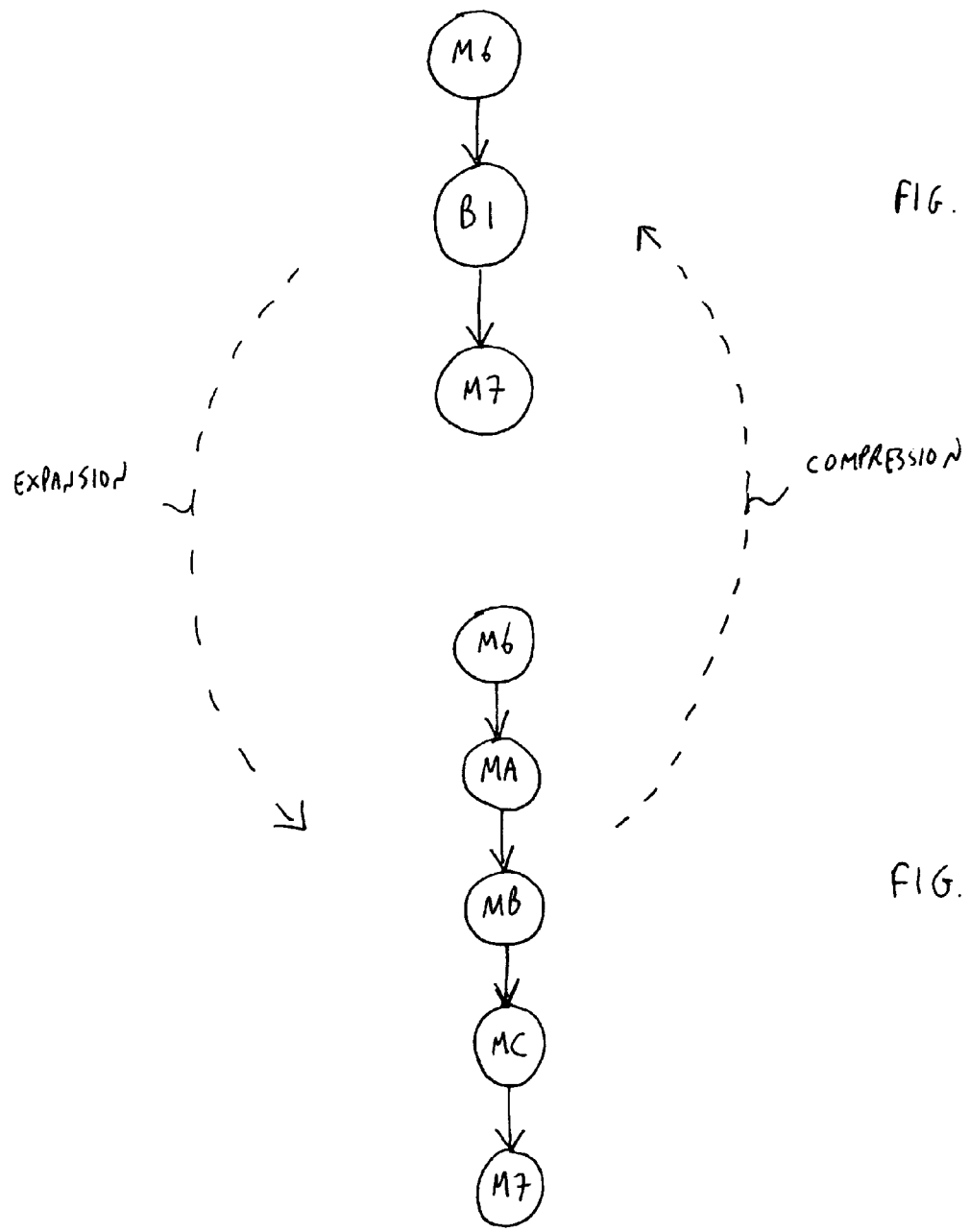
FIGS. 7a and 7b demonstrate the expansion of a master queue blank into a plurality of master queue substantive entries, and, the compression of a number of master queue substantive entries into a master queue blank.

FIGS. 7a and 7b respectively show the expansive effect on a link list (i.e., the number of messages within a link list increases) that results when a blank is replaced with its corresponding messages, and, the compressive effect on a link list (i.e., the number of messages within a link list decreases) that results when a number of messages are replaced with a blank. The former corresponds to a call-up of messages from the database into cache. The later corresponds to a cache eviction.

With respect to the expansive effect, FIG. 7a corresponds to an earlier link list state that FIG. 7b. That is, progressing in time from FIG. 7a to FIG. 7b, blank B1 is replaced between link list messages M6 and M7 with messages MA, MB, MC. Here, messages MA, MB, MC are called into cache from the database and inserted into the link list. By contrast, with respect to the compressive effect, FIG. 7b corresponds to an earlier link list state than FIG. 7a. That is, progressing in time from FIG. 7b to FIG. 7a, messages MA, MB and MC are replaced with blank B1 between link list elements M6 and M7.

According to one approach, in the case of expansion, a messaging service instance's storage manager oversees (e.g., causes to happen) the reading of messages from the database and the incorporation of these messages into their corresponding link list in the case of link list expansion, and, oversees the eviction of messages from memory in the case of link list compression. According to an even further implementation, the storage manager locks link list elements that border the affected link list element.

For example, in the case of expansion, initially link list elements M6 and M7 are locked, then, message MA is read from the database and inserted into the link list between locked elements M6 and M7. Then, the lock on M6 is released and a lock is placed on newly inserted element MA. Then, message MB is read from database and inserted between locked elements MA and M7. The "sliding" lock is then moved from element MA to element MB and message MC is read from the database and inserted between locked elements MB and M7. The locks on elements MB and M7 are then removed. Locking the elements in this fashion prevents a cursor element from progressing through a section of a link list that is currently under-going an expansive change. Similarly, in the case of compression, link list elements M6 and M7 are locked, elements MA, MB and MC are removed from the link list, then elements M6 and M7 unlocked. Before any locks are placed, the storage manager should first check to ensure a cursor component is not actually processing a link list section between the elements that are about to be locked.

With techniques for link list expansion (removal of blank) and link list compression (insertion of blank) having been discussed, the timing at which either of these processes is to happen is pertinent to the issue of avoiding cache misses while conserving memory resources. Specifically, link list sections that cover a range of cached messages that are not about to be needed for delivery in the near future should be compressed into a blank, and, likewise, link list blanks that cover a range of persisted messages that are about to be needed for delivery in the near future should be expanded into their corresponding messages.

Figure 8:
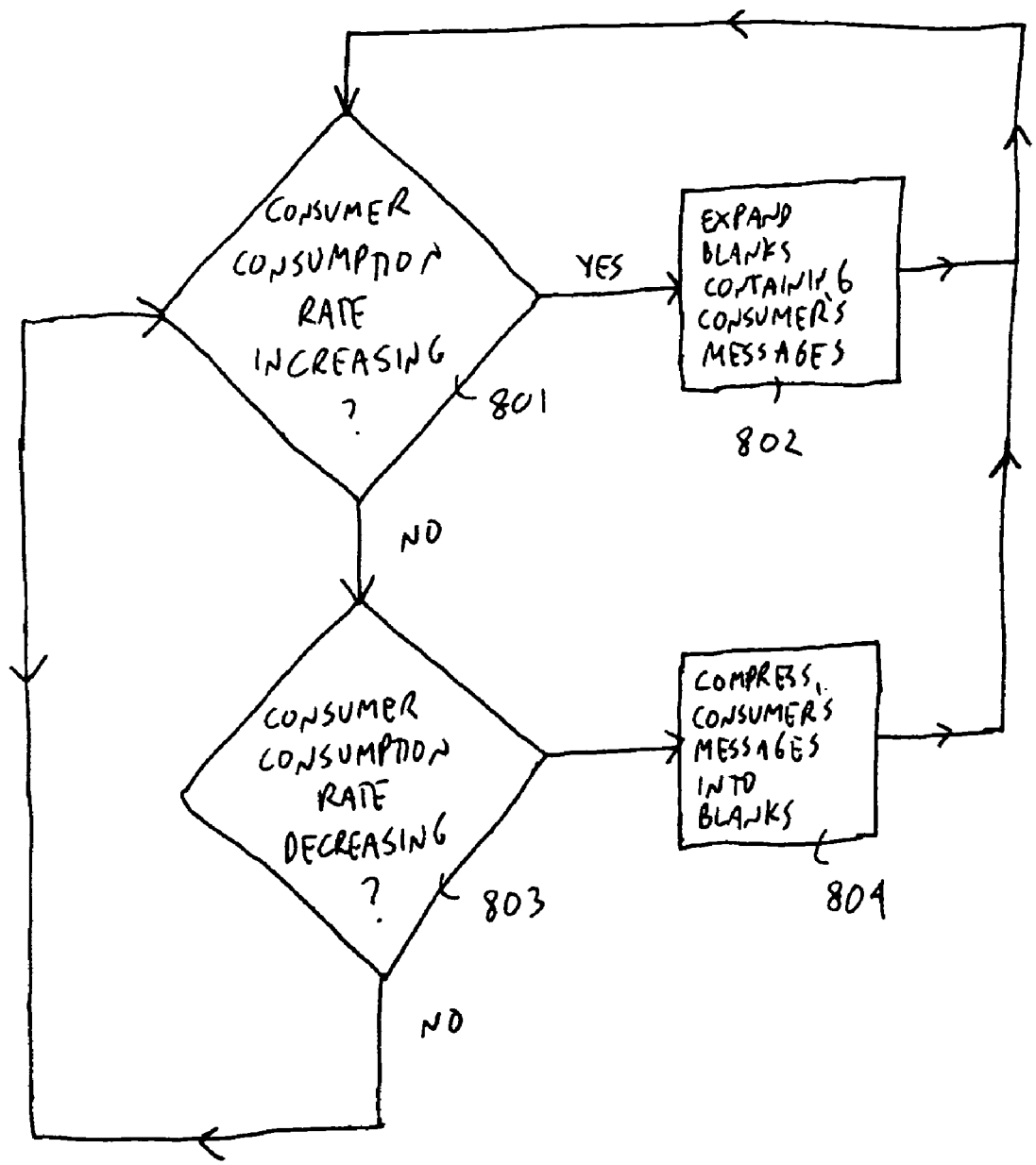
FIG. 8 shows a method for modifying the number of master queue entries for a consumer as a function of the consumer's consumption rate.
Figure 9:
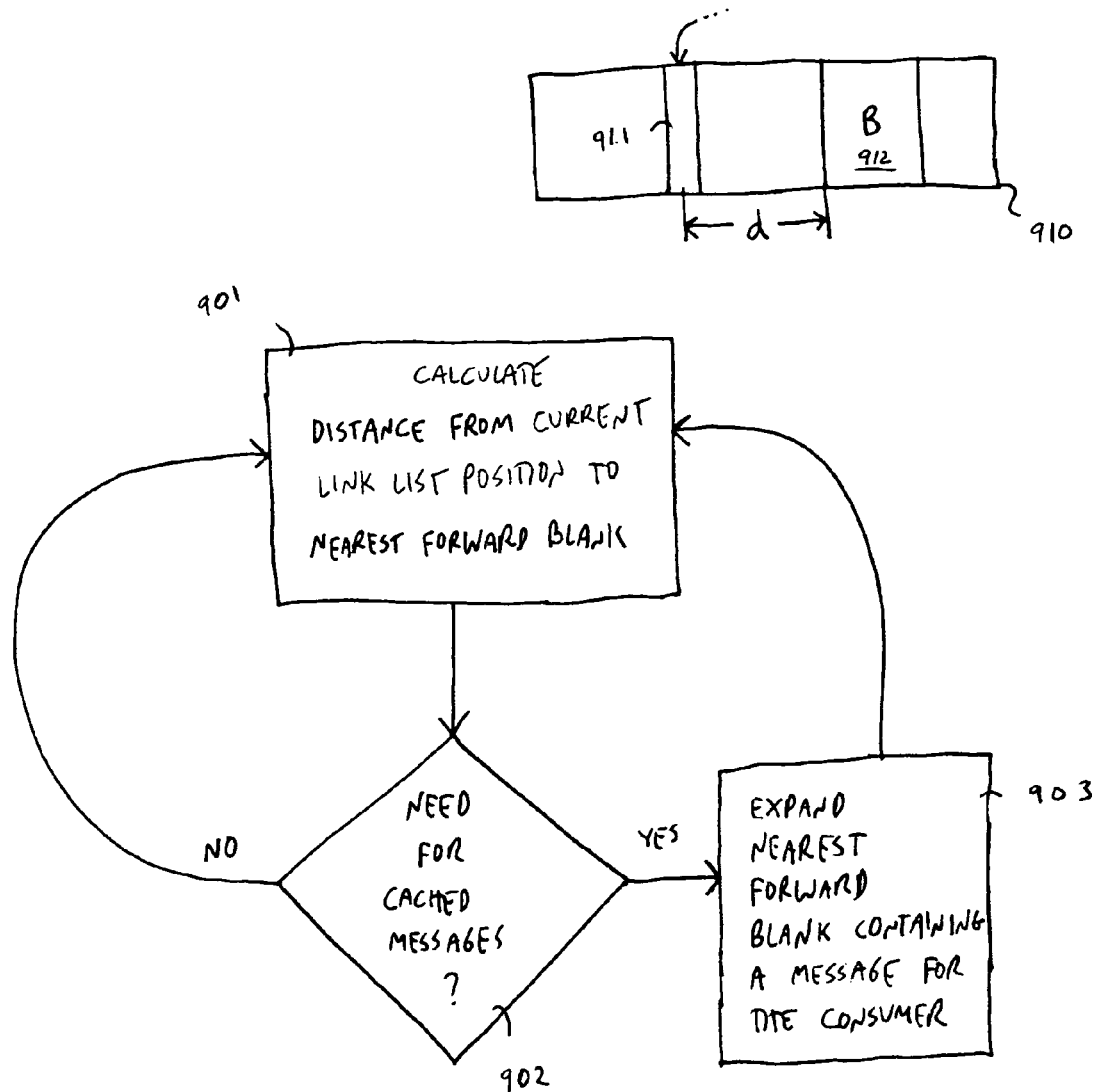
FIG. 9 shows a method for modifying the number of master queue entries for a consumer as a function of the consumer's consumption rate and the distance to the nearest forward blank whose range covers messages waiting to be delivered to the consumer.

In this respect, referring to FIG. 3, the statistics manager 311 is responsible for monitoring certain parameters that are used to effect timely link list expansions and compressions consistently with the principles outlined just above. FIGS. 8 and 9 relate to such parameters and techniques for applying them to effect expansive or compressive link list changes.

FIG. 8 pertains to the measurement of a consumer's consumption of messages. From the discussion of FIG. 3, recall that the consumer presents a "next" request (e.g., next request 360) to a cursor component (e.g., cursor component 321_1) when the consumer is ready to receive another message. Each consumer typically corresponds to a unique application software program that runs in the container, and, because different applications are apt to have different messaging flows, different applications are apt to demonstrate different rates at which they issue "next" requests to their corresponding cursor components. Specifically, applications that are heavily targeted by messages (e.g., an application associated with a popular web site) are expected to ask for messages at higher rates than applications that are not heavily targeted by messages (e.g., an application associated with an unpopular web site).

In an implementation, the statistics manager 311 is configured to measure the rate at which messages are being requested for each of the consumers 306_1, 306_2 serviced by the statistics manager's messaging service instance. The storage manager 312 monitors the rates being measured by the statistics manager 311, and, uses this information to impose appropriate changes to the various link lists containing messages for the respective consumers. For instance, as seen in FIG. 8, if a consumer demonstrates an increased rate 801 at which next messages are issued, the storage manager will decrease the number of blanks containing messages for the consumer 802 (through expansion of these blanks). Likewise, if a consumer demonstrates a decreased rate 803 at which next messages are being issued, the storage manager will increase the number of blanks containing messages for the consumer 804.

FIG. 9 demonstrates another process that involves the calculation, for each consumer, of a distance (as measured by a number of link list elements) between the current position of the consumer's cursor component position (i.e., the particular link list element that the cursor component is processing) and the nearest forward blank element that covers a persisted message for the consumer 901. FIG. 9 shows an exemplary depiction of the master queue in which the range of link list elements (across one or more link lists) is shown as contiguous range 910. If the cursor component for a particular consumer is currently processing link list element 911, and, if the nearest downstream blank that covers a message for the consumer is blank 912; then, the distance in terms of number of link list elements between link list element 911 and link list element (blank) 912 is depicted in FIG. 9 is depicted as distance "d".

In the methodology of FIG. 9, the calculation of this distance for a particular consumer corresponds to process 901. If the distance d becomes small enough 902, the nearest blank 912 is expanded so as to bring the message covered by the blank into the master queue before the cursor component begins to process the link list element corresponding to blank 912. Here, different critical "d" distances may be calculated for each consumer that trigger an expansion 903, and monitored "d" distances may be monitored for each consumer. Thus, for any consumer, there are two "d" values: a critical d value and a monitored d value. If the monitored d value falls below the critical d value 902, an expansion is triggered 903.

Here, the critical d value for a consumer can be based upon the measured rate, discussed just above with respect to FIG. 8, at which the consumer is issuing "next" requests. Specifically, a formulation or algorithm may be used to determine the critical distance d based upon the speed at which the cursor component for a consumer can march through the master queue and the rate at which the consumer asks for new messages. The formulation or algorithm should effect an increase in the critical d as the cursor and consumer rates slow, and, a decrease in the critical d as the cursor and consumer rates increase. In an implementation, the statistics manager calculates the critical d for each consumer and the storage manager tracks the monitored d for each consumer d. The storage manager also repeatedly checks the monitored d against the critical d in order to determine whether an expansion is warranted.

Figure 10A:
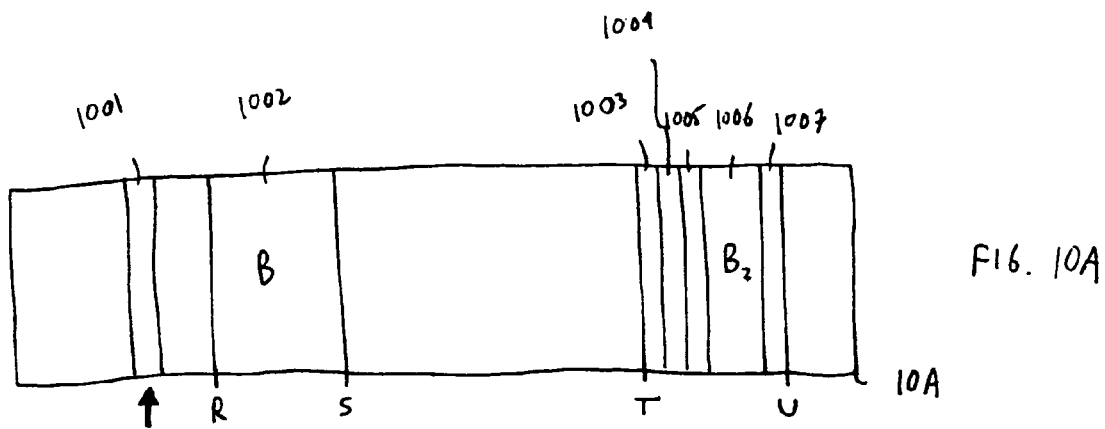
FIGS. 10a and 10b show a technique for caching messages that are about to be delivered to a consumer while conserving memory usage.
Figure 10B:
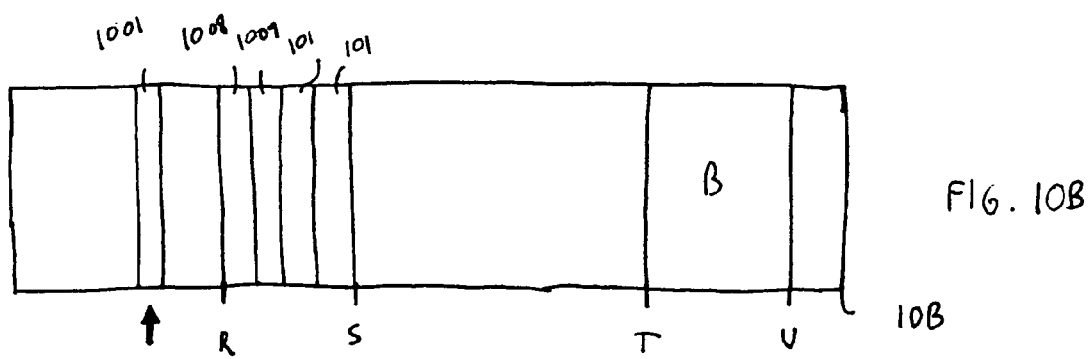

If an expansion is warranted, in order to conserve memory resources, a compression is desirable in some other portion of the master queue. FIGS. 10A and 10B illustrate another technique in which the expansion of a blank (i.e., a first blank disappears) to bring messages into the master queue causes a cache eviction of messages located proximate to a blank within the master queue (i.e., a second blank increases its corresponding database range). Thus, in order to conserve memory resources, the disappearance of a blank on behalf of a consumer is balanced by the growth of another within the master queue FIG. 10B shows an instance of time that follows FIG. 10A. Viewing FIG. 10A and then FIG. 10B, a situation is shown where the closeness (e.g., less than the critical distance) of a cursor component's position (at link element 1001) to a nearby blank (blank element 1002) that covers a message for the consumer for whom the cursor component is acting causes expansion at the blank 1002 so as to bring messages 1009 through 1011 into the master queue. However, an attempt is made to reduce the effect of the memory consumption increase caused by the introduction of messages 1009-1011 into the master queue by increasing the range of a downstream blank 1006. Here, the range of blank 1006 is increased so as to cause the eviction of messages 1003, 1004, 1005 and 1007. According to one technique, blank 1006 is chosen at least in part because none of messages 1003, 1004, 1005, 1007 are within the critical distance to their respective consumer's consumer component's current processing position. According to one implementation, for each of messages 1003, 1004, 1005 and 1007, the storage manager measures the distance between the message and its cursor component's position, and compares this distance against the critical distance (or some factor of the critical distance such as 2.0, 3.0 or 4.0). If the distance is greater than the critical distance (or factor thereof), the message is considered eligible for eviction so as to be covered by a neighboring blank (e.g., message 1005, is evicted first so as to increase the range of blank 1006; then, message 1004 is evicted so as to further increase the range of blank 1006, etc,)

Figure 11A:
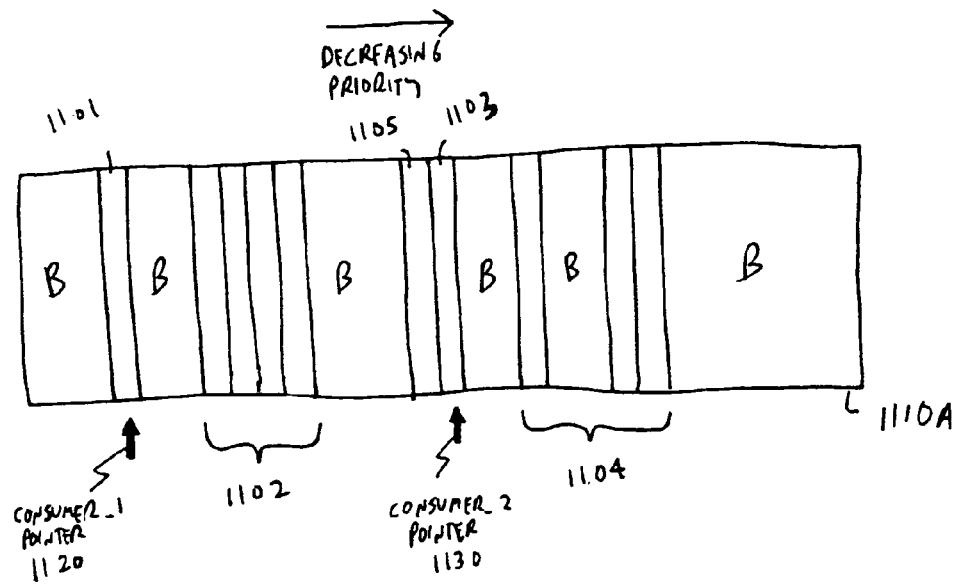
FIGS. 11a and 11b shows a technique for servicing multiple consumers while conserving memory resources.
Figure 11B:
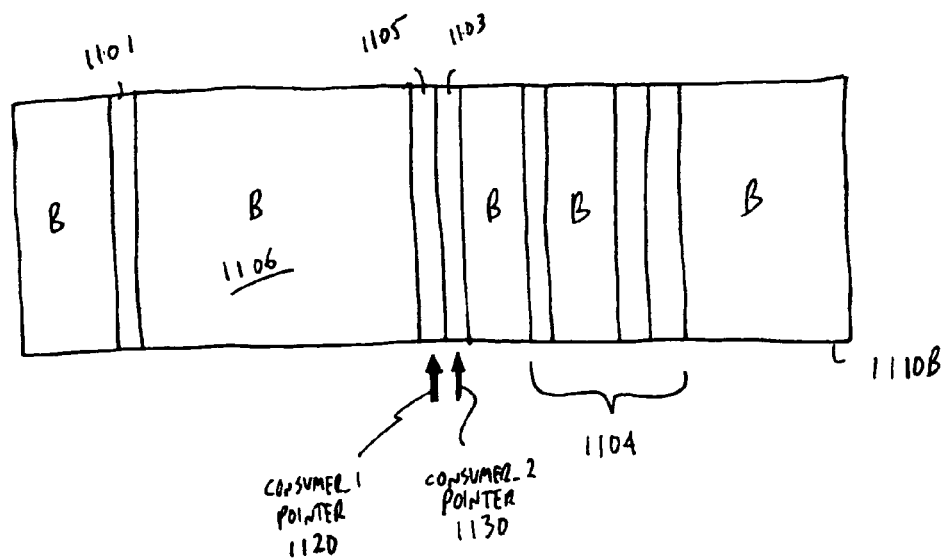

The memory consumption conservation process described above in FIGS. 10A and 10B may be difficult to achieve in cases where different cursor components are positioned at widely varied positions across the master queue. FIGS. 11A and 11B show another technique in which, in order to synchronize the techniques of FIGS. 9 and 10A, 10B for a number of different consumers, their positions of their corresponding cursor components are aligned (or at least brought closer to one another) so as to, for example, point to link elements within the same or neighboring link lists.

Again FIG. 11B corresponds to a time after FIG. 11A. Referring to FIG. 11A, messages within range 1102 cannot be evicted because at least one of them is for a consumer that cursor component pointer 1120 acts on behalf of. Moreover, messages within range 1004 cannot be evicted because at least one of them is for another consumer that cursor component pointer 1130 acts on behalf of. As of the time depicted in FIG. 11B, the pointers 1120, 1130 have been moved closer together so as to permit messages within range 1102 to be covered by blank 1106. Note that blank 1106 corresponds to a much wider ranged blank that essentially merges both the blank regions observed on opposite sides of messages 1102 of FIG. 11A. According to one approach, the movement of a cursor from a higher priority to a lower priority is permitted. According to one approach, the storage manager identifies the opportunity to gain a memory efficiency through cursor movement and causes one or more cursors to move position and then follows up with a message eviction.

Figure 12A:
FIGS. 12a and 12b show a pair of neighboring blanks being compressed into a single blank.
Figure 12B:
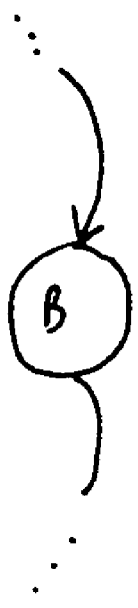

FIGS. 12A and 12B show another technique in which neighboring blanks are merged so as to consume one link list element instead of two. That is, FIG. 12B corresponds to a time after FIG. 12A. In FIG. 12A two link list elements are consumed by two neighboring blanks. By merging the blanks (specifically, by increasing the range of one blank so as to cover the range of the other blank), a single link list element is used to cover the same database range represented by the pair of blanks of FIG. 12A.

Figure 13:
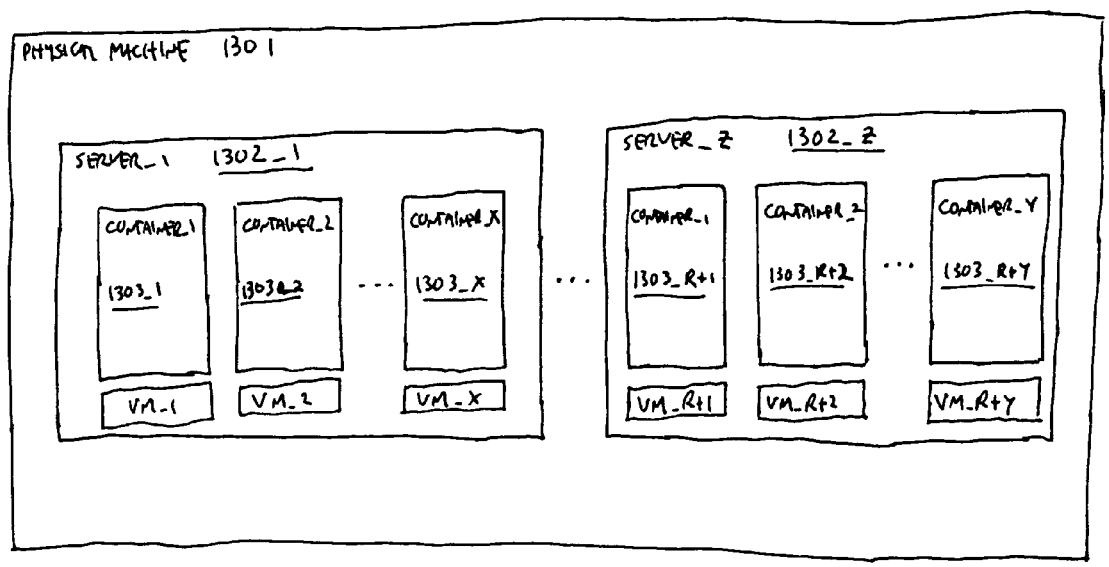
FIG. 13 shows a physical machine having multiple server instances which each possess multiple containers.

FIG. 13 shows an depiction of a physical machine 1301 having multiple "servers" 1302_1 through 1302_Z where each server runs a plurality of containers (e.g., server 1302_1 runs containers 1303_1 through 1303_X, . . . , server 1302_Z runs containers 1303_R+1 through 1303_R+Y). According to the implementation of FIG. 13, each container is "run on" its own associated virtual machine (VM). If each of the containers depicted in FIG. 13 is to have its own messaging service as described above, memory allocations may be made according to a hierarchy as depicted in FIG. 14.

Memory Management

Figure 14:
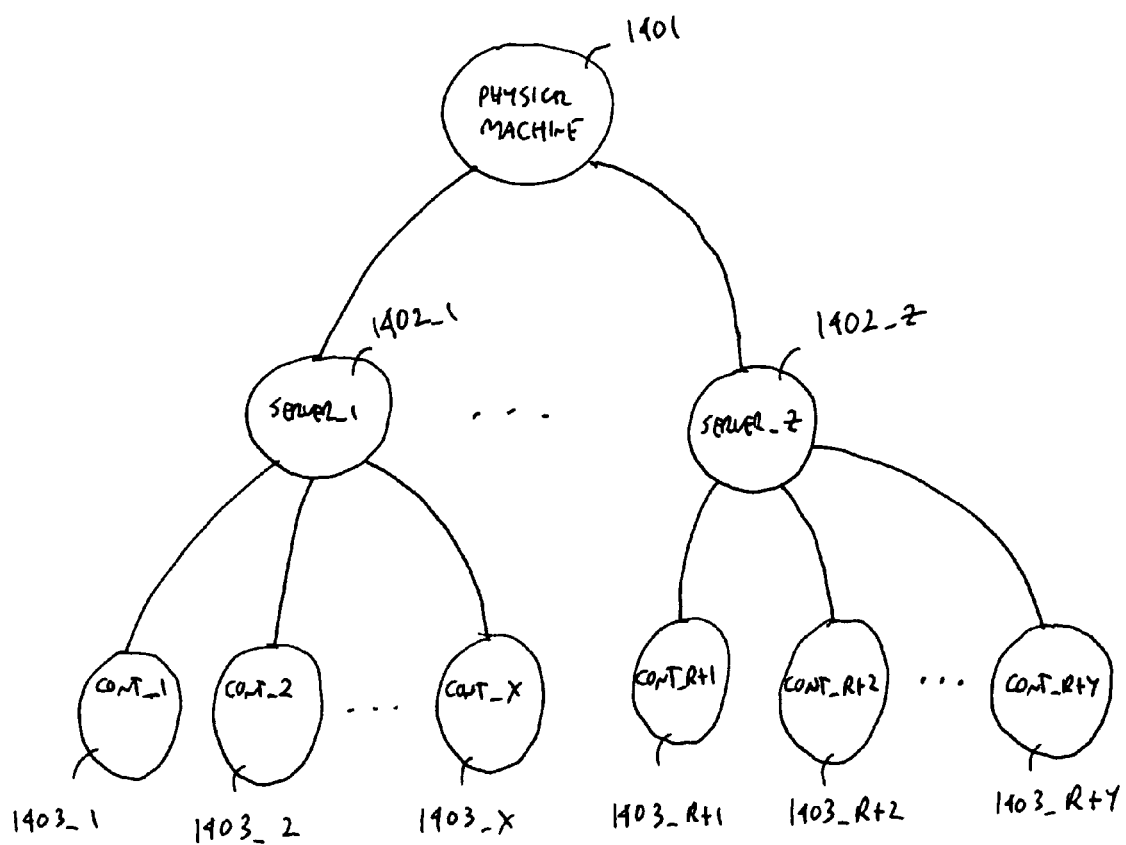
FIG. 14 shows a memory management hierarchy scheme that contemplates the physical machine of FIG. 13.

Referring to FIG. 14, the total combined memory allocation for a group of messaging service instances that are instantiated on the same server is viewed as being the messaging service memory allocation given to the server as a whole (e.g., the aggregation of the memory allocation that is given to messaging service instances 1403_1 through 1403_X is viewed as the memory allocation given to server 1402_1). Moreover, the total combined memory allocation given to the servers within the physical machine is viewed as the memory allocation given to messaging services within the machine as a whole (e.g., the aggregation of the memory allocation give to servers 1402_1 through 1402_Z is viewed as the amount of the physical machine's memory given to messaging services machine-wide).

Referring to FIG. 3, recall the presence of a memory manager 313 within each messaging service instance. A messaging service instance memory manager 313 is responsible for obtaining more memory resources for its respective instance in cases where a memory increase is deemed appropriate (e.g., the ratio non cached persisted messages to total messages has surpassed some threshold) to a memory manager that operates at the server level. According to one implementation, referring back to FIG. 14, the server node memory manager (e.g., manager 1402_1) initially allocates less to its subservient messaging service instances (e.g., instances 1403_1 through 1403_X) so that there exists some free memory that the instances may call for on an as needed basis.

If a messaging service instance's memory manager believes it needs more memory for its corresponding master queue, an "allocate" request is sent to its superior node (the server level memory manager) to request some of the reserved free space. If none is available, the memory manager may try to force allocation of memory space for its master queue by causing an inquiry to made, at the server level, into each of the server's constituent messaging service instances (e.g., server level manager 1402_1 inquires into each of messaging service instances 1403_1 through 1403_X).

According to this inquiry process, each of the subservient messaging service instances report to the server level memory manager: 1) how much free memory space presently exists (i.e., the difference between the amount of memory space allocated to a messaging service instance and the amount of memory space it is presently consuming); 2) the total memory size presently allocated to the messaging service instance; 3) the initial memory allocation given to the messaging service instance.

The sever level memory manager sorts the messaging service instances in order (highest memory consumer first, lowest memory consumer last). The server level manager then asks each messaging service instance's memory manager to reduce its memory allocation by K bytes where K is the amount of memory that the requesting memory manager has asked for. Each manager returns the amount of its own memory it is willing to free up. The server manager then moves instance by instance down the sorted list until the aggregate amount of memory willingly given up by the memory managers reaches K bytes. At this point K bytes is given to the requesting memory manager and those on the sorted list whose contribution was counted have a corresponding deduction taken from their memory allocation.

If the entire list for the server is processed and K bytes still has not been reached, a repeat process is essentially repeated at the machine-server levels. That is, the server level memory manager 1402_1 asks the machine level memory manager for free memory 1401. If no free memory exists, the server memory manager 1402_1 forces the machine level manager 1401 to inquire into its subservient server level memory managers (e.g., managers 1402_1 through 1402_Z) for them to report the same three parameters mention above (free memory, total memory, initial memory), a ranked list is made, and contributions from the server levels are aggregated to try to satisfy the requesting server level managers request.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of non-transitory machine-readable media suitable for storing electronic instructions. Program code may also be downloaded from a remote computer (e.g., a server) to a requesting computer (e.g., a client) e.g., via a communication link (e.g., a network connection).

Figure 15:
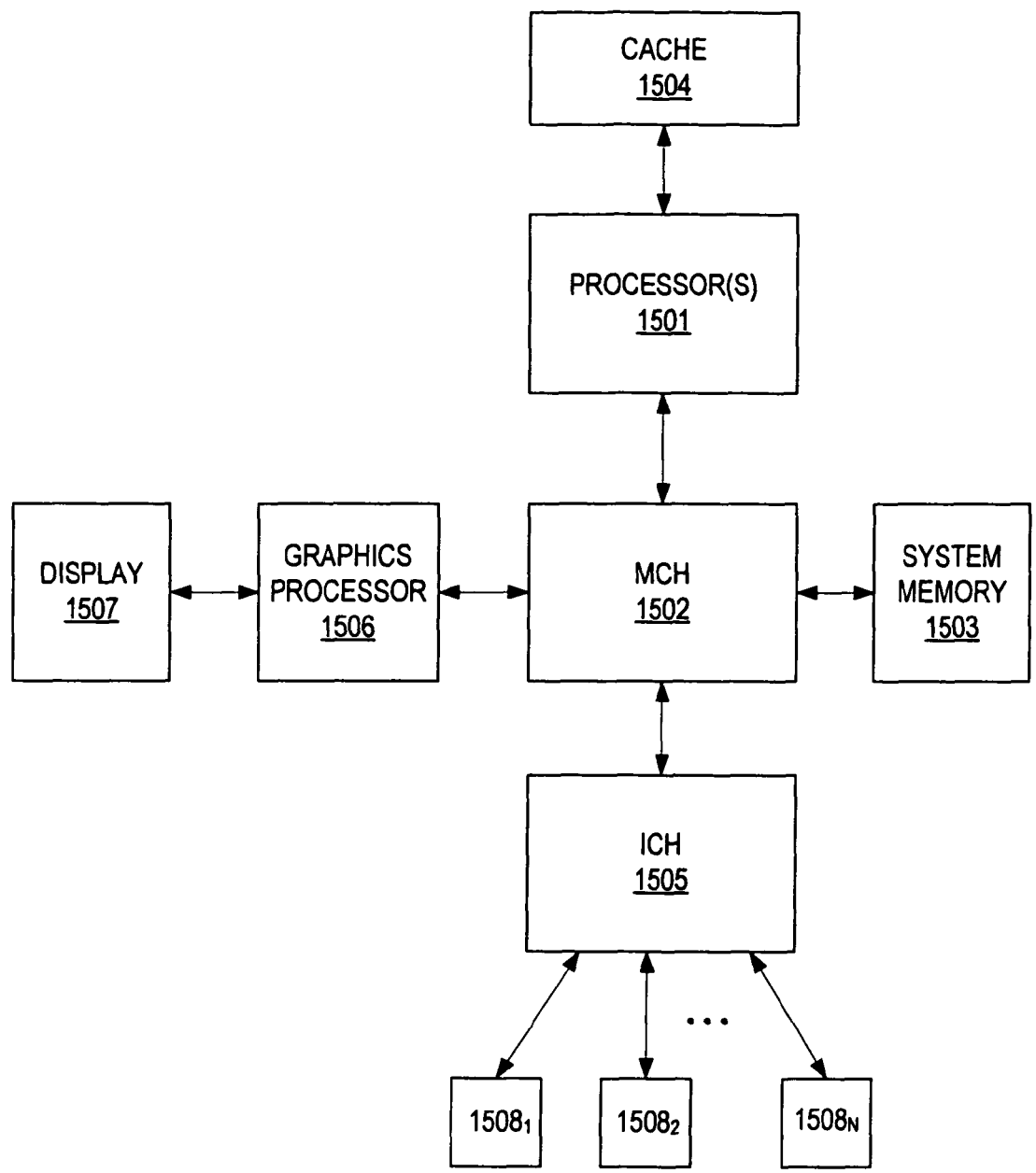
FIG. 15 shows a depiction of a computing system.

FIG. 15 shows an embodiment of a computing system (e.g., a computer). The exemplary computing system of FIG. 15 includes: 1) one or more processors 1501; 2) a memory control hub (MCH) 1502; 3) a system memory 1503 (of which different types exist such as DDR RAM, EDO RAM, etc,); 4) a cache 1504; 5) an I/O control hub (ICH) 1505; 6) a graphics processor 1506; 7) a display/screen 1507 (of which different types exist such as Cathode Ray Tube (CRT), Thin Film Transistor (TFT), Liquid Crystal Display (LCD), DPL, etc.; 8) one or more I/O devices 1508.

The one or more processors 1501 execute instructions in order to perform whatever software routines the computing system implements. The instructions frequently involve some sort of operation performed upon data. Both data and instructions are stored in system memory 1503 and cache 1504. Cache 1504 is typically designed to have shorter latency times than system memory 1503. For example, cache 1504 might be integrated onto the same silicon chip(s) as the processor(s) and/or constructed with faster SRAM cells whilst system memory 1503 might be constructed with slower DRAM cells. By tending to store more frequently used instructions and data in the cache 1504 as opposed to the system memory 1503, the overall performance efficiency of the computing system improves.

There is understood to be a distinction between the term "cache" as used with respect to the operation of software (as described above with respect to FIGS. 1 through 14) and the term cache as is used just above with respect to the operation of hardware. The former (software) understood meaning of the term cache typically refers to storage within memory (e.g., system memory 1503) but items stored in memory may be called into a hardware cache (e.g., cache 1504) as described just above (e.g., because they are frequently used).

System memory 1503 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1503 prior to their being operated upon by the one or more processor(s) 1501 in the implementation of a software program. Similarly, data that a software program determines should be sent from the computing system to an outside entity through one of the computing system interfaces, or stored into an internal storage element, is often temporarily queued in system memory 1503 prior to its being transmitted or stored.

The ICH 1505 is responsible for ensuring that such data is properly passed between the system memory 1503 and its appropriate corresponding computing system interface (and internal storage device if the computing system is so designed). The MCH 1502 is responsible for managing the various contending requests for system memory 1503 access amongst the processor(s) 1501, interfaces and internal storage elements that may proximately arise in time with respect to one another.

One or more I/O devices 1508 are also implemented in a typical computing system. I/O devices generally are responsible for transferring data to and/or from the computing system (e.g., a networking adapter); or, for large scale non-volatile storage within the computing system (e.g., hard disk drive). ICH 1505 has bi-directional point-to-point links between itself and the observed I/O devices 1508.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
reading program code from program memory and processing said program code with one or more processors to perform the following method:
measuring a rate at which a consumer application within a container is asking for new messages;
searching for a next one of said new messages by advancing a cursor through a link list of messages, said link list having messages to be delivered to multiple consumer applications within said container including said consumer application, said messages in said link list being linked in order of their arrival to said container, said link list being stored in memory of a computer in which said container is instantiated, said link list containing a blank that represents additional messages that are persisted in a database external to said computer, said additional messages arranged in said database in order of their arrival to said container, said blank being positioned in said link list:
i) after a first portion of said messages in said link list, said first portion of said messages having arrived to said container before said additional messages, said cursor pointing to a position in said first portion of said messages;
ii) before a second portion of said messages in said link list, said second portion of said messages having arrived to said container after said additional messages; and
loading said additional messages into said link list at said blank's position before a calculation based on said rate determines that said cursor will reach said blank.

2. The method of claim 1 wherein said method further comprises triggering said loading in response to a first distance measured along said link list being less than a second distance measured along said link list.

3. The method of claim 2 wherein said calculation includes calculating said first distance from said cursor to said blank's position.

4. The method of claim 3 wherein said calculation includes calculating said second distance from said cursor to a position on said link list, said position being calculated from said rate.

5. The method of claim 1 wherein said method further comprises, after said calculation is completed and prior to said loading, persisting a group of messages from said memory to create free space within said memory for said additional messages to be loaded.

6. The method of claim 1 wherein said method is executed by said container's messaging service.

7. The method of claim 1 wherein said method further comprises:
persisting from said memory a group of messages arranged in order of arrival to said container as a consequence of said rate having decreased, said group of messages having at least one message for said consumer application.

8. A computing system comprising one or more processors coupled to a program memory having program code stored therein, said one or more processors to read said program code from said program code memory and process said program code to perform the following method:
reading program code from program memory and processing said program code with one or more processors to perform the following method:
measuring a rate at which a consumer application within a container is asking for new messages;
searching for a next one of said new messages by advancing a cursor through a link list of messages, said link list having messages to be delivered to multiple consumer applications within said container including said consumer application, said messages in said link list being linked in order of their arrival to said container, said link list being stored in memory of a computer in which said container is instantiated, said link list containing a blank that represents additional messages that are persisted in a database external to said computer, said additional messages arranged in said database in order of their arrival to said container, said blank being positioned in said link list:
i) after a first portion of said messages in said link list, said first portion of said messages having arrived to said container before said additional messages, said cursor pointing to a position in said first portion of said messages;
ii) before a second portion of said messages in said link list, said second portion of said messages having arrived to said container after said additional messages; and
loading said additional messages into said link list at said blank's position before a calculation based on said rate determines that said cursor will reach said blank.

9. The computing system of claim 8 wherein said method further comprises triggering said loading in response to a first distance measured along said link list being less than a second distance measured along said link list.

10. The computing system of claim 9 wherein said calculation includes calculating said first distance from said cursor to said blank's position.

11. The computing system of claim 10 wherein said calculation includes calculating said second distance from said cursor to a position on said link list, said position being calculated from said rate.

12. The computing system of claim 8 wherein said method further comprises, after said calculation and prior to said copying, persisting a group of messages from said memory to create free space within said memory for said additional persisted messages.

13. The computing system of claim 8 wherein said method is executed by said container's messaging service.

14. The computing system of claim 8 wherein said method further comprises:
persisting a group of messages from said link list because said first rate has decreased and/or said second rate has decreased, and, at least one message of said group of messages is to be delivered to said consumer.

15. A non-transitory machine readable storage medium containing program code, said program code to be processed by one or more processors to perform a method, said method comprising: reading program code from program memory and processing said program code with one or more processors to perform the following method:
measuring a rate at which a consumer application within a container is asking for new messages;
searching for a next one of said new messages by advancing a cursor through a link list of messages, said link list having messages to be delivered to multiple consumer applications within said container including said consumer application, said messages in said link list being linked in order of their arrival to said container, said link list being stored in memory of a computer in which said container is instantiated, said link list containing a blank that represents additional messages that are persisted in a database external to said computer, said additional messages arranged in said database in order of their arrival to said container, said blank being positioned in said link list:

i) after a first portion of said messages in said link list, said first portion of said messages having arrived to said container before said additional messages, said cursor pointing to a position in said first portion of said messages;

ii) before a second portion of said messages in said link list, said second portion of said messages having arrived to said container after said additional messages; and loading said additional messages into said link list at said blank's position before a calculation based on said rate determines that said cursor will reach said blank.

16. The non-transitory machine readable storage medium of claim 15 wherein said method further comprises triggering said loading in response to a first distance measured along said link list being less than a second distance measured along said link list.

17. The non-transitory machine readable storage medium of claim 16 wherein said calculation includes calculating said first distance from said cursor to said blank's position.

18. The non-transitory machine readable storage medium of claim 17 wherein said calculation includes calculating said second distance from said cursor to a position on said link list, said position being calculated from said rate.

19. The non-transitory machine readable storage medium of claim 15 wherein said method further comprises, after said calculation is completed and prior to said copying, persisting a group of messages from said memory to create free space within said memory for said additional persisted messages.

20. The non-transitory machine readable storage medium of claim 15 wherein said method is executed by said container's messaging service.

21. The non-transitory machine readable storage medium of claim 15 wherein said method further comprises:

persisting a group of messages from said link list because said first rate has decreased and/or said second rate has decreased, and, at least one message of said group of messages is to be delivered to said consumer.

* * * * *